(12) United States Patent
Berning et al.

(10) Patent No.: US 10,100,471 B2
(45) Date of Patent: Oct. 16, 2018

(54) AUTOMOTIVE CONSTRUCTION MACHINE

(71) Applicant: Wirtgen GmbH, Windhagen (DE)

(72) Inventors: Christian Berning, Brühl (DE);
Thomas Kramer, Königswinter (DE);
Dieter Simons, Buchholz (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 14/922,800

(22) Filed: Oct. 26, 2015

(65) Prior Publication Data

US 2016/0160454 A1 Jun. 9, 2016

Related U.S. Application Data

(63) Continuation of application No. 14/075,193, filed on Nov. 8, 2013, now Pat. No. 9,181,664, which is a
(Continued)

(30) Foreign Application Priority Data

Apr. 19, 2007 (DE) .................... 20 2007 005 756 U

(51) Int. Cl.
*E01C 23/088* (2006.01)
*B62D 33/063* (2006.01)
(Continued)

(52) U.S. Cl.
CPC ........ *E01C 23/088* (2013.01); *B62D 33/0636* (2013.01); *E01C 21/00* (2013.01);
(Continued)

(58) Field of Classification Search
CPC .................................................. E01C 23/088
(Continued)

(56) References Cited

U.S. PATENT DOCUMENTS 3,182,605 A 5/1965 Brasher
3,431,016 A 3/1969 Mundt-Petersen et al.
(Continued)

FOREIGN PATENT DOCUMENTS

CA 2548521 6/2005
DE 204690 A1 12/1983
(Continued)

OTHER PUBLICATIONS

Sep. 16, 2011—English translation of Request for Cancellation, re German Utility Model 202007005756 (not prior art).
(Continued)

*Primary Examiner* — Sunil Singh
(74) *Attorney, Agent, or Firm* — Lucian Wayne Beavers; Patterson Intellectual Property Law, PC

(57) ABSTRACT

In an automotive construction machine, with a machine frame (4) with preferably vertically arranged lateral outer walls (5), a milling drum (6) mounted in the machine frame (4) for working a ground surface or traffic surface (8), and with an operator's platform (10), it is provided that the operator's platform (10) is moveable on the machine frame (4) transversely to the direction of travel, and is moveable outwards beyond the lateral outer walls (5) of the machine frame (4), that the machine frame (4) is provided with a guide (18) for the operator's platform (10) acting transversely to the direction of travel, and that the guide (18) projects laterally either not at all or just slightly beyond the outer walls (5).

12 Claims, 8 Drawing Sheets

Related U.S. Application Data continuation of application No. 12/081,505, filed on Apr. 17, 2008, now Pat. No. 8,590,983.

(51) Int. Cl.
*E01C 21/00* (2006.01)
*E01C 23/06* (2006.01)
*E01C 23/12* (2006.01)
*E01C 23/01* (2006.01)

(52) U.S. Cl.
CPC ............ *E01C 23/01* (2013.01); *E01C 23/065* (2013.01); *E01C 23/127* (2013.01); *E01C 2301/30* (2013.01)

(58) Field of Classification Search
USPC ................. 299/39.1–39.8; 404/90, 93, 94
See application file for complete search history.

(56) References Cited

U.S. PATENT DOCUMENTS

| | | | |
|---|---|---|---|
| 4,421,188 A | 12/1983 | Fredricksen | |
| 4,616,880 A * | 10/1986 | Nozaki | E21C 47/00 299/39.2 |
| 4,819,738 A | 4/1989 | Fountain | |
| 5,086,869 A | 2/1992 | Newbery et al. | |
| 5,190,398 A | 3/1993 | Swisher, Jr. | |
| 5,294,210 A | 3/1994 | Lemelson | |
| 5,618,156 A | 4/1997 | Brown | |
| 5,749,783 A | 5/1998 | Pollklas | |
| 5,893,677 A | 4/1999 | Haehn et al. | |
| 6,039,141 A | 3/2000 | Denny | |
| 6,097,425 A | 8/2000 | Behnke et al. | |
| 6,189,964 B1 * | 2/2001 | Henshaw | B60N 2/38 297/112 |
| 6,877,818 B1 * | 4/2005 | Gaertner | E01C 23/088 172/122 |
| 6,943,824 B2 * | 9/2005 | Alexia | A01D 43/073 348/120 |
| 6,990,399 B2 | 1/2006 | Hrazdera et al. | |
| 7,204,546 B2 | 4/2007 | Antonetti | |
| 7,422,391 B2 * | 9/2008 | Holl | E01C 23/088 299/1.5 |
| 7,441,625 B2 | 10/2008 | Ackermann | |
| 7,540,685 B2 | 6/2009 | Avikainen et al. | |
| 7,594,562 B2 | 9/2009 | Heusinger | |
| 9,121,145 B2 | 9/2015 | Berning et al. | |
| 2002/0083695 A1 | 7/2002 | Behnke et al. | |
| 2004/0021364 A1 | 2/2004 | Busley et al. | |
| 2005/0207841 A1 | 9/2005 | Holl et al. | |
| 2005/0261799 A1 | 11/2005 | Groth et al. | |
| 2006/0034661 A1 | 2/2006 | Junga et al. | |
| 2007/0037621 A1 * | 2/2007 | Isfort | A01D 43/086 460/114 |
| 2008/0216021 A1 | 9/2008 | Berning et al. | |

FOREIGN PATENT DOCUMENTS

| | | |
|---|---|---|
| DE | 3128284 C2 | 12/1983 |
| DE | 9317225.7 U1 | 2/1994 |
| DE | 9317225 U1 | 2/1994 |
| DE | 4426059 A1 | 2/1996 |
| DE | 19513551 A1 | 5/1998 |
| DE | 29802858 U1 | 5/1998 |
| DE | 29806492 U1 | 8/1998 |
| DE | 19620072 C2 | 2/2000 |
| DE | 19837288 A1 | 2/2000 |
| DE | 10357074 B3 | 5/2005 |
| EP | 0300271 A1 | 1/1989 |
| EP | 0346802 A1 | 12/1989 |
| EP | 0570753 A1 | 11/1993 |
| EP | 0620319 A1 | 10/1994 |
| EP | 0935025 B1 | 4/2005 |
| EP | 1959056 A2 | 8/2008 |
| EP | 2301318 B1 | 11/2011 |
| EP | 1344445 B2 | 3/2012 |
| FR | 1545123 | 11/1968 |
| GB | 2078634 A | 1/1982 |
| JP | 63013867 A | 1/1988 |
| JP | 07061287 A | 3/1995 |
| JP | 11181832 | 7/1999 |
| NL | 6919162 | 6/1971 |
| WO | 8901435 A1 | 2/1989 |
| WO | WO 95/16826 * | 6/1995 |
| WO | 9624725 A1 | 8/1996 |
| WO | 02064398 A1 | 8/2002 |
| WO | 2004059088 A1 | 7/2004 |

OTHER PUBLICATIONS

Feb. 24, 2012—Machine translation of patent owners response re German Utility Model 202007005756 (not prior art).
Aug. 7, 2012—German correspondence from cancellation petitioner with exhibit pp. 3 and 4, and machine translation thereof re German Utility Model 202007005756 (not prior art).
Sep. 7, 2012—Machine translation of patent owners response re German Utility Model 202007005756 (not prior art).
Oct. 11, 2012—German correspondence from cancellation petitioner and machine translation thereof re German Utility Model 202007005756 (not prior art).
Mar. 14, 2013—Machine translation of correspondence from cancellation petitioner re German Utility Model 202007005756 (not prior art).
E5: Product Presentation "Messepremiere neuer Walzengenerationen" (Exhibition debut of new generation of drums) in Wissensportal baumaschine.de 2 (2004).
E10: BOMAG Stabilizer/Recycler MPH 125 brochure and photographs as on the INTERMAT fair 2006.
E14: European Search Report dated Jun. 16, 2011 in corresponding European Patent Application EP 08 154 152.6 (not prior art).
E15: Wirtgen Brochure—WR 2000 (2007).
E16: Declaration of Lutz Stallgies (not prior art).
E17: Declaration of Robert Laux (not prior art).
E18: BOMAG Press Release, Mar. 2006.
E19: BOMAG INTERMAT 2006.
E20: Examination Report for European Patent Application EP 1983106 A2 (not prior art).
E27: Machine translation of JP 11-181832.
Hamm Brochure, "DV Series—Think Forward", Hamm AG, (2004).
"World Highways", article entitled "'Revolutionary' driving concept" discussing Hamm DV Series (Mar. 2004).
Exhibit A: Fernus, Claudia, Wirtgen GmbH, Windhagen, "Neuentwicklungen im Kalt- und Heissrecycling", Wissensportal baumaschine. de, 2(2004), 8 pp.
Exhibit B: Photos of Marini S.p.a. machine MF 1007, alleged to be introduced in the market in 1990.
Exhibit C: Machine translation of DE 196 20 072 A1.
Exhibit D: Machine translation of DE 31 28 284 A1.
Office Action dated Dec. 10, 2009 re Australian Patent Application No. 2008201640 (not prior art).
European Search Report in corresponding European Patent Application No. EP 16154116, dated Aug. 4, 2016, 2 pp. (not prior art).

* cited by examiner

AUTOMOTIVE CONSTRUCTION MACHINE

SUMMARY OF THE INVENTION

The invention relates to an automotive construction machine, in particular road milling machine, recycler or a stabilizer.

Such road milling machines are known, for instance, from WO02/01005. Such a road milling machine is provided with a machine frame carried by a chassis, and has essentially vertically arranged lateral outer walls. A milling drum for working a ground surface or traffic surface is mounted inside the machine frame. The road milling machine is furthermore provided with an operator's platform with an operating and indicating panel, as well as a seat for the machine driver. A stabilizer is known from DE 103 57 074.

The machine driver has to turn around during reverse travel. The seat of the machine driver is preferably arranged on the so-called zero side of the road milling machine, being that side where the milling drum, with its front end, can be guided closest along an obstacle, for instance, the edge of a curb or a crash barrier.

On that side lying opposite of the zero side, the front end of the milling drum cannot be guided along an obstacle as closely due to the drive mechanism.

From his seat, which is arranged on the zero side, the machine driver can observe the outer edge of the machine lying opposite of the zero side by means of exterior mirrors.

Because of the restricted view and observation possibilities, the machine driver is dependent on an accompanying helper who will assist him in particular when in maneuvering mode and in milling mode. This will result in very long periods of time, however, in particular when in milling mode, in which the helper will not be occupied.

The purpose of the invention is, therefore, to further develop a construction machine of the type first mentioned above in such a manner that the visibility for the machine driver is improved, so that the operation of a construction machine is possible both in maneuvering mode and in working mode without additional helping persons.

BRIEF SUMMARY OF THE INVENTION

The invention provides in an advantageous manner that the operator's platform is moveable transversely to the direction of travel, and that the seat for the machine driver is integrated into the operator's platform, which is moveable outwards beyond the lateral outer walls of the machine frame, with the said machine frame being provided with a guide for the operator's platform acting transversely to the direction of travel, and the guide projecting either not at all or just slightly beyond the lateral outer walls. The operator's platform is capable of being moved beyond the lateral outer walls only partially, it being sufficient that the machine driver in the operator's platform can observe the lateral outer wall and the area next to the outer wall.

According to the invention, the machine driver can move beyond the lateral outer walls on both sides of the construction machine with his seat, so that he is able to optimally observe the outer walls of the machine in maneuvering and milling mode. In case of an obstacle, for instance, a streetlight, the machine driver can also briefly shift his operator's platform towards the center until the construction machine has passed the obstacle.

The operator's platform may be mounted to swivel around a vertical axis, at least in the outer limit positions of the at least one guide, when beyond the lateral outer walls. The machine driver can thus be brought into an optimal position for observation of the machine when in maneuvering and milling mode.

The operating and indicating panel is preferably integrated into the moveable operator's platform. In this way, the machine driver will not have to leave his seat for the purpose of operating the machine, or for reading indicating instruments.

An advantageous further development provides that a column attached at the moveable operator's platform carries the operating and indicating panel in an adjustable distance from the machine driver. In this way, the operating and indicating panel can be ergonomically adapted to each machine driver.

A preferred embodiment provides that the height of the seat surface of the seat, or the height of the standing surface in the operator's platform is adjustable in such a manner that the eye level when sitting essentially corresponds to the eye level of the machine driver when standing. In this way, it is ensured that the machine driver possesses the same overview of the machine when sitting as when standing.

The seat is provided with armrests, where operating elements for the machine's control may be arranged in extension of one armrest of the seat.

The operator's platform is preferably enclosed by a weather protection facility, which is capable of being moved in conjunction with the operator's platform.

The weather protection facility may consist of a cabin.

The cabin is preferably capable of being folded down or lowered or folded over for transport, so as to be able to keep the maximum transport dimensions of the road milling machine low for bridge underpasses when transporting on a low loader. The cabin is, for instance, capable of being folded around an axis running parallel to the direction of travel, if its width transverse to the direction of travel is significantly narrower than its height.

The operating and indicating panel is provided with control, operating and indicating elements for travelling and maneuvering mode, for milling mode, and for monitoring of the milling mode.

Ascending aids for the machine driver may be arranged at the lateral outer walls, the said ascending aids being capable of automatically swivelling into a position in which they rest dose to the outer wall for the purpose of reducing the road milling machine's minimum distance from obstacles. These ascending aids, for instance, ladders with rails, may be placed against the outer wall of the road milling machine by means of electric or hydraulic remote control, without manual operation or assistance by helping persons, so that the road milling machine can be guided up to obstacles as closely as possible, in particular on the zero side.

Tilting mirrors may additionally be provided, which are capable of automatically swivelling into a position in which they project laterally either not at all or just slightly beyond the outer wall for the purpose of reducing the road milling machine's minimum distance from obstacles.

The operator's platform may be provided with a vertical swivelling axis that runs between the seat and the operating and indicating panel, and preferably centrally between the seat and the operating and indicating panel. In this way, the seat of the machine driver will effect a swivelling movement around the said vertical swivelling axis, which preferably runs orthogonally to the machine frame.

The seat of the machine driver may additionally be capable of swivelling either with the operator's platform or independent of the operator's platform, so that the reversing mode is also facilitated for the machine driver. Preferably, a swivelling angle of 180° is sufficient, with a larger rotation angle possibly being of advantage as well.

The swivelling movement around the vertical swivelling axis of the operator's platform is preferably only released in the outer limit positions of the seat unit at the ends of the rail guide.

It may be provided that the seat for the machine driver is capable of swivelling outwards automatically in the outer limit positions of the operator's platform at the ends of the rail guide. This means that the machine driver will not have to actuate any operating or control elements to reach an optimal sitting position for observation of the road surface to be worked, the steering angle, a gauge rod, and the markings on the road surface.

The seat or the operator's platform and/or the cabin may be capable of being raised into an elevated position for the traveling and maneuvering mode.

The operator's platform may be arranged in front of the machine frame and/or the chassis when seen in the direction of travel, in particular with a recycler or stabilizer.

The operator's platform may be attached in a moveable manner at a swivel frame of the machine frame, and may be capable of being raised or lowered by means of the swivel frame. In that case, the guide for the operator's platform, which runs transversely to the direction of travel, is arranged at the swivel frame of the machine frame.

The swivel frame is articulated at the machine frame preferably in a parallelogram-type manner, so that the operator's platform or the cabin respectively is shifted in parallel direction when raised or lowered.

It is preferably provided that the swivel frame projects vis-à-vis the operator's platform in height direction and/or transversely to the direction of travel in such a manner that it forms a rollover protection.

In the following, embodiments of the invention are explained in more detail with reference to the drawings.

DETAILED DESCRIPTION OF THE INVENTION

Figure 1:
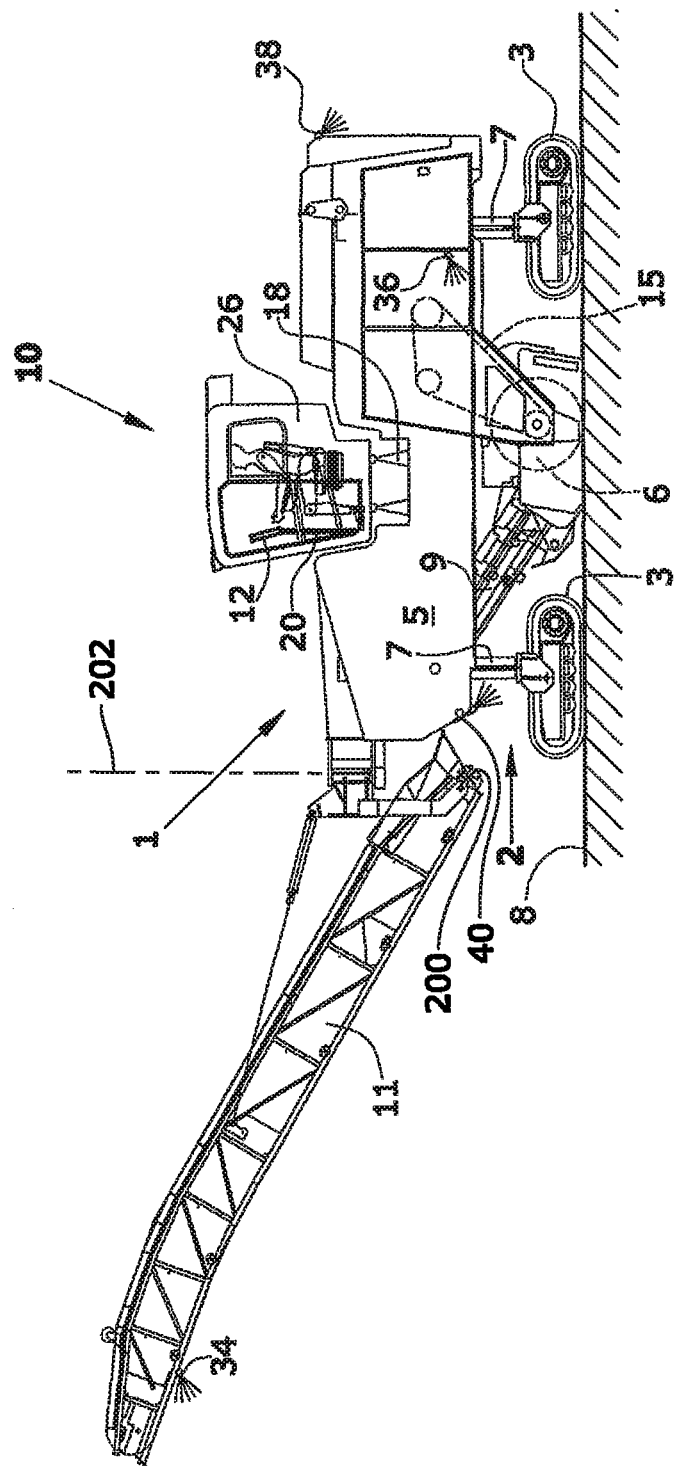
FIG. 1 is a road milling machine.
Figure 2:
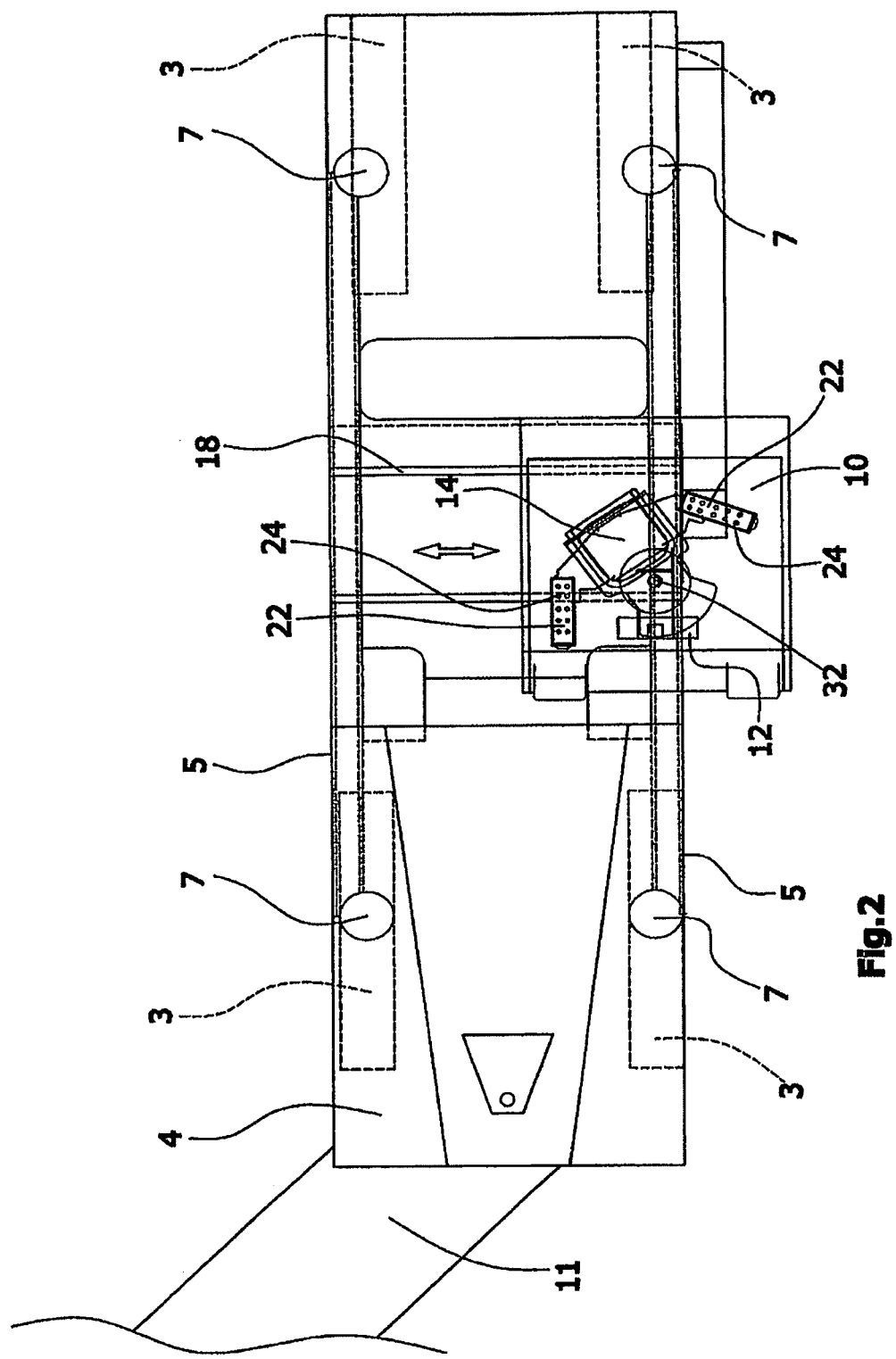
FIG. 2 is a top view of the road milling machine shown in FIG. 1.
Figure 3:
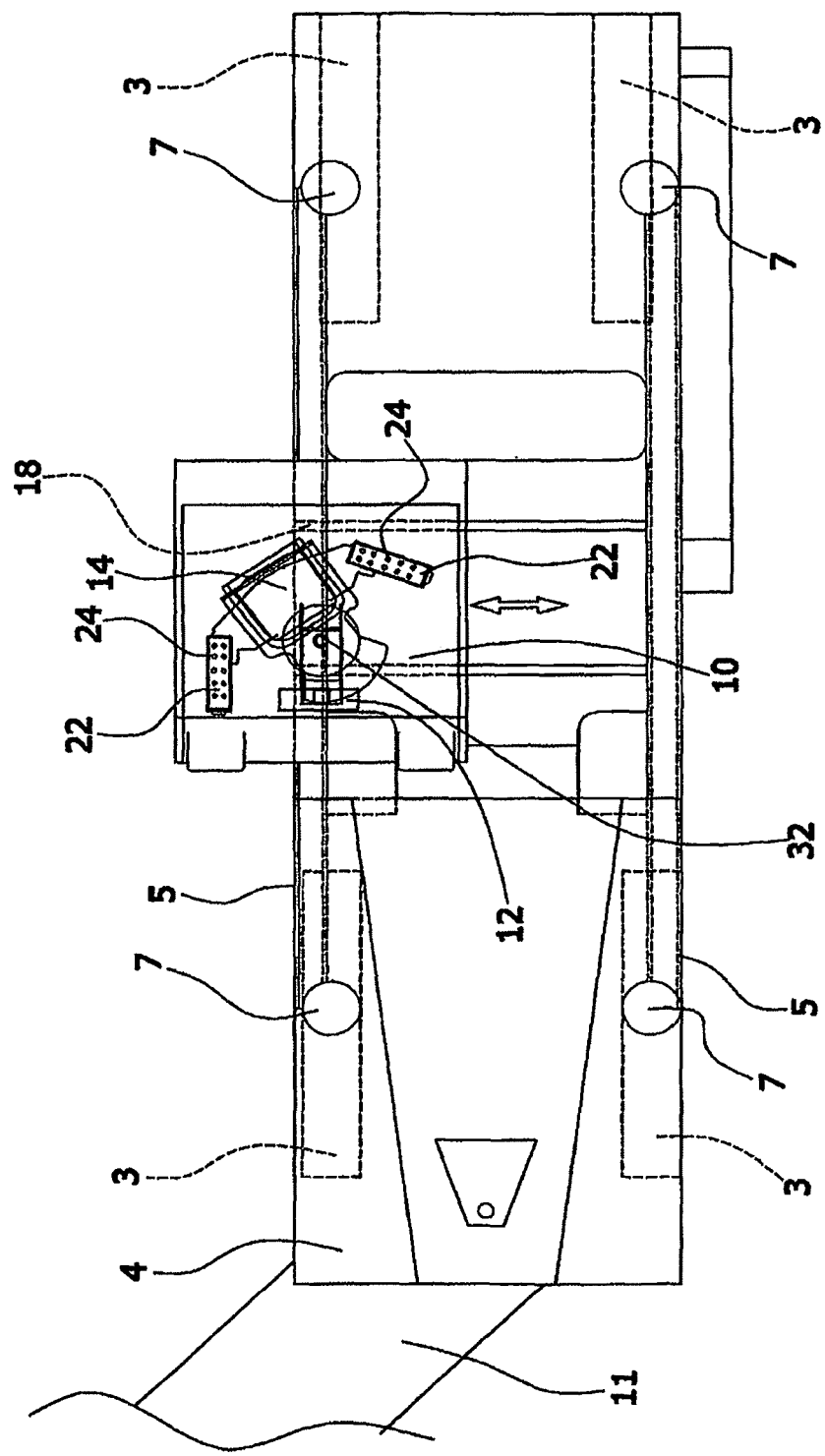
FIG. 3 is a further top view of the road milling machine shown in FIG. 1.
Figure 4:
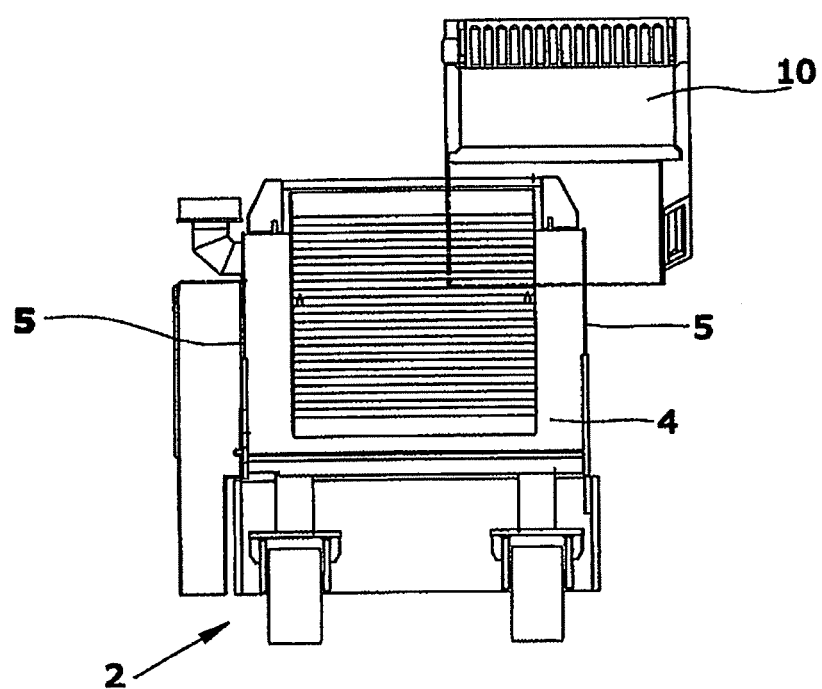
FIG. 4 is a rear view of the road milling machine shown in FIG. 1.
Figure 5:
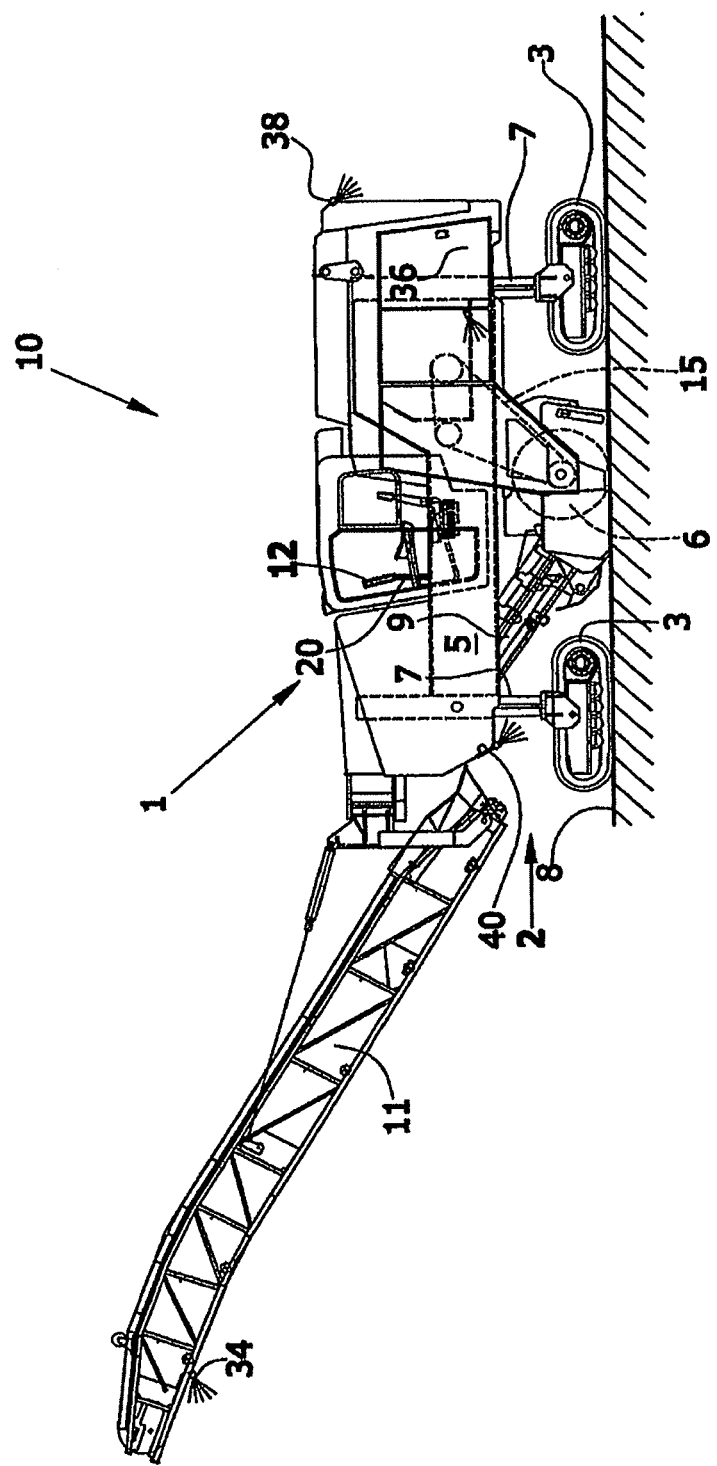
FIG. 5 is a side view of the road milling machine, where the cabin of the operator's platform is in transport position.
Figure 6:
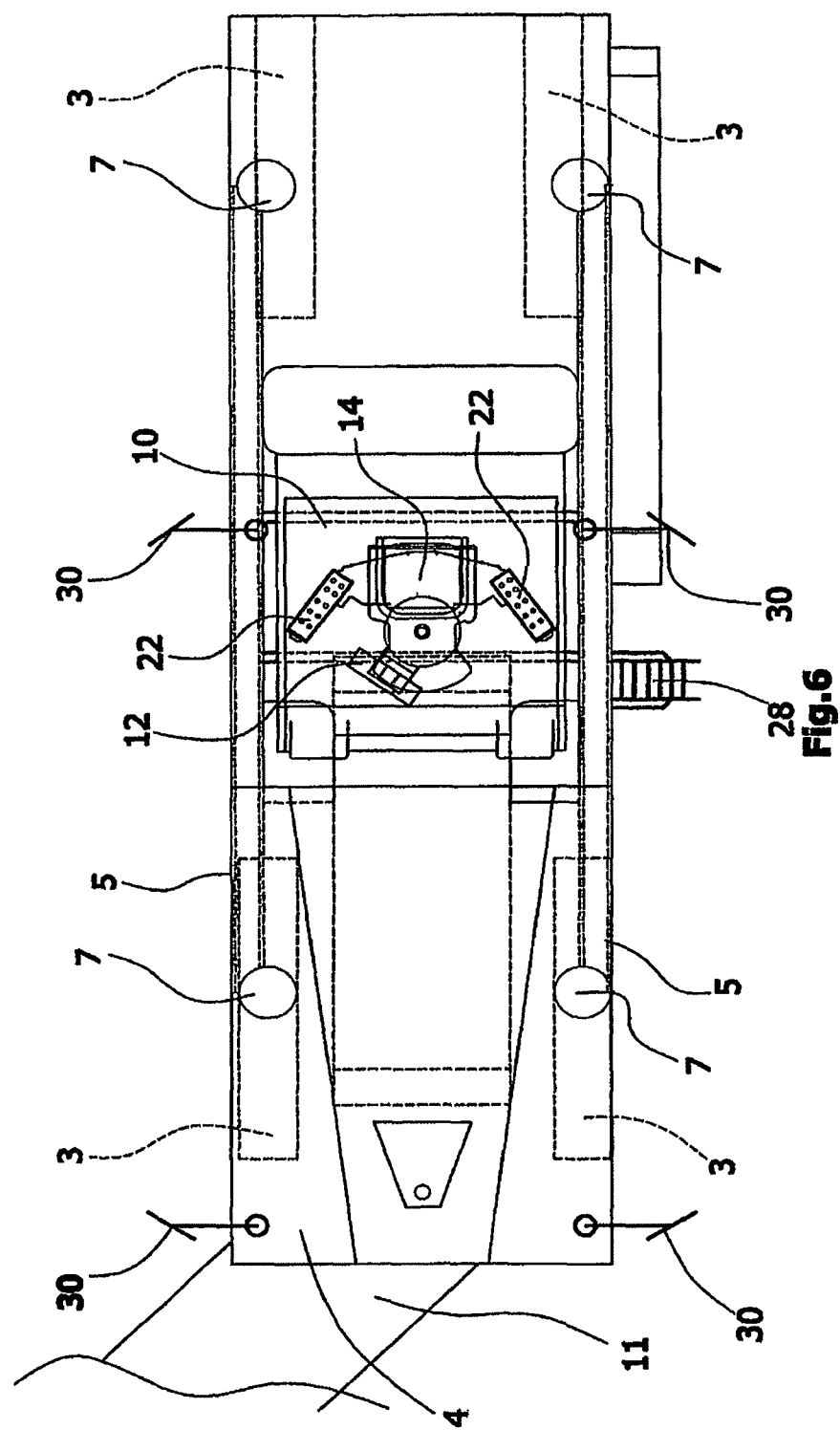
FIG. 6 is a top view of the road milling machine in accordance with FIG. 5, where the cabin is in transport position.

FIG. 1 shows a road milling machine 1 for milling ground surfaces or traffic surfaces 8 in the embodiment of a front-loading road milling machine. The road milling machine 1 is provided with a chassis 2 with, for example, four crawler track units 3, which carries the machine frame 4 of the road milling machine 1. It is understood that the crawler track units 3 may be substituted wholly or in part by wheel units. A milling drum 6, which extends transversely to the direction of travel, is mounted in the machine frame 4. The milling depth is preferably set by means of the height adjustment of the crawler track units 3 via lifting columns 7. The road milling machine 1 depicted in FIG. 1 is also called a front-loading road milling machine, as it is capable of conveying the milled material towards the front when seen in the direction of travel onto a transport vehicle. A first transport device 9, consisting of a transport conveyor, is arranged in front of the milling drum 6 when seen in the direction of travel, the said first transport device 9 transferring the milled material preferably to a second transport device 11 consisting of a transport conveyor. It is understood that the road milling machine 1 may also be provided with only one single transport conveyor. The machine frame 4 is provided with essentially vertically arranged lateral outer walls 5. An operator's platform 10 with an operating and indicating panel 12 and a seat 14 for the machine driver is arranged on the top side of the machine frame. The seat 14 and the operating and indicating panel 12 are integrated into the operator's platform 10, which is moveable transversely to the direction of travel. The operator's platform 10 can be moved outwards beyond the lateral outer walls 5 of the machine frame 4 on a guide 18, preferably a rail guide, which is connected to the machine frame 4. The rail guide 18 does preferably not project laterally beyond the outer walls 5, with the operator's platform 10 being nonetheless capable of being moved to nearly its center beyond the lateral outer walls 5, as can best be seen from FIGS. 2 and 3.

The guide 18 may run linearly or slightly curved in a horizontal plane essentially transverse to the direction of travel, or may consist of a parallel guide in which the operator's platform is shifted in a parallel manner.

As seen in FIG. 1, the rear end of conveyor 11 is pivotally connected to the front end of machine frame 4 so as to pivot about both a horizontal axis 200 and a vertical axis 202.

The seat 14 for the machine driver is mounted to swivel. It is preferably provided that the seat 14 is capable of swivelling in conjunction with an operating and indicating panel 12 around a vertical axis 32 within the operator's platform 10.

The operating and indicating panel 12 integrated into the moveable operator's platform 10 is attached at a column 20 in an adjustable distance from the machine driver for that purpose, and is capable of swivelling around the vertical axis 32 with the seat 14 or independent of the same.

The seat 14 may be adjustable in height with regard to its seat surface in such a manner that the eye level of the machine driver when sitting essentially corresponds to the eye level when standing within the operator's platform 10.

The seat 14 may be provided with armrests 22, which are provided with the operating elements 24 for the machine's control.

The operator's platform 10 is enclosed by a cabin 26 serving as a weather protection facility. In central position of the cabin 26 between the outer walls 5, the cabin is capable of being lowered relative to the machine frame 4 in such a manner that the upper edge of the cabin 26 terminates flush with the machine elements arranged in front of and behind the cabin 26 and attached to the machine frame 4. The cabin 26 is thus in a transport position to keep the construction height low when transporting the road milling machine 1 on a low loader.

Alternatively, the cabin may be capable of folding down or capable of swivelling around a horizontal axis running parallel to the direction of travel if the cabin 26 is narrow in comparison to its height.

Ascending aids 28 in the form of ladders with hand rails may be arranged at the lateral outer walls 5, the said ascending aids 28 being capable of swivelling in the direction of the outer wall 5 by means of drives when the machine driver is in the operator's platform 10, so that they rest as closely as possible to the outer wall 5. The ascending aids are preferably arranged on that side of the road milling machine 1 that lies opposite of the zero side and on which the belt drive 15 for the milling drum 6 is also arranged.

It is understood, however, that the ascending aids may also be arranged on the zero side of the road milling machine 1. The zero side of the machine is that side on which the front end of the milling drum 6 ends in very close proximity to the outer wall 5 and on which the belt drive 15 is not arranged, so that milling close to edges or close to obstacles is possible on the zero side of the machine FIGS. 7 to 10 show a soil stabilizer/recycler 100. The machine frame 4 may be carried by a chassis 2 via lifting columns, the said chassis 2 preferably being provided with wheels 103. In such a construction machine, the operator's platform 10 is located in front of the machine frame 4 and also in front of the chassis 2. The operator's platform 10 enclosed by a cabin 26 can be seen in FIGS. 7 and 8, the said operator's platform 10 being connected to the machine frame 4 via a swivel frame 16 of the machine frame 4. The front part of the swivel frame 16 when seen in the direction of travel forms, at the same time, the guide 18 for the cabin 26 which is moveable transversely to the direction of travel.

An ascending aid 28 may be attached at the cabin 26.

FIGS. 7-10 show the swivel frame 16 of the machine frame 4, which is connected to the machine frame 4 in a parallelogram-type manner via control arms 102, 104.

Figure 10:
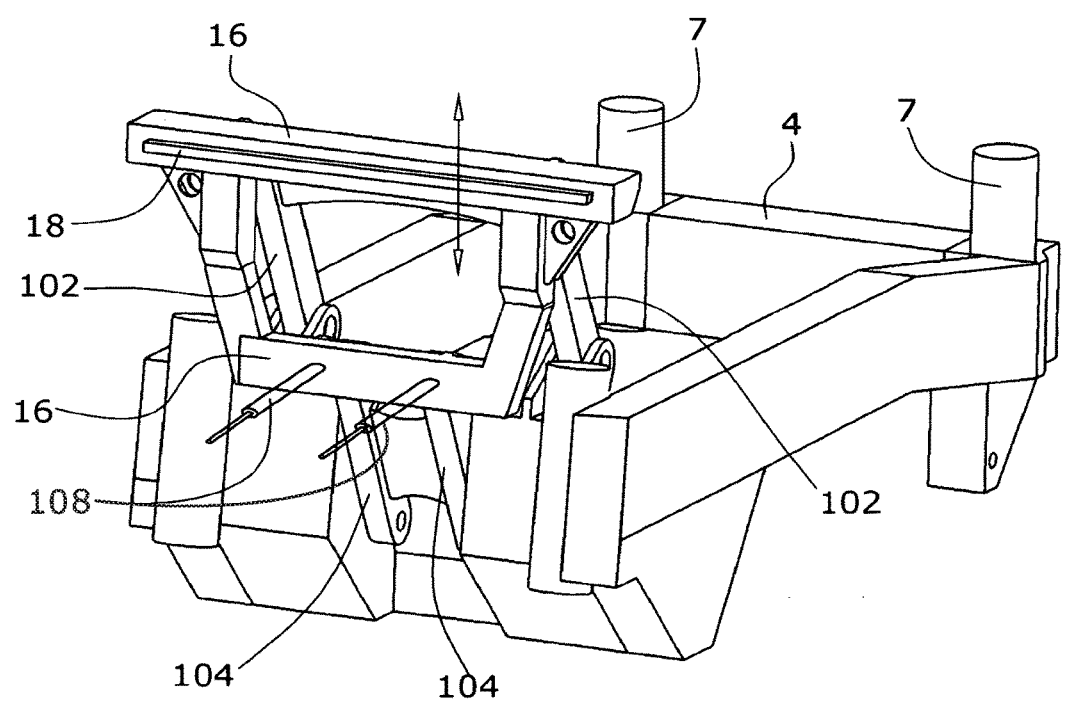

Because of the parallelogram-type articulation of the swivel frame 16, it is possible to shift the operator's platform 10 from a lower position to an upper position and back in a parallel manner without changing the inclination of the cabin 26 relative to a vertical plane that runs transversely to the direction of travel. The inclination may also be adjustable, however, through a suitable design of the parallelogram-type articulation or through additional devices 108 in longitudinal inclination and/or transverse inclination (FIG. 10).

Figure 7:
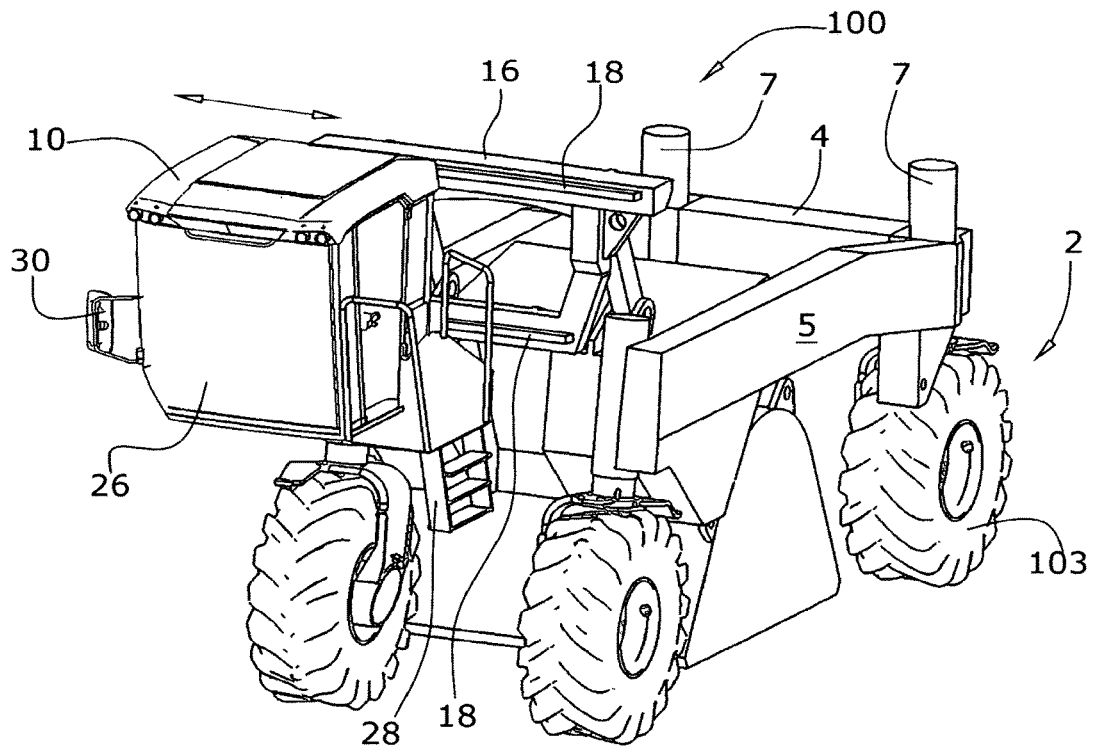
FIGS. 7 and 8 are a perspective view of a stabilizer.

On the swivel frame 16, guides 18 running parallel to the ground, linearly, or curved in a horizontal plane may be provided at the upper and/or lower cross beams of the swivel frame 16, the said guides 18 enabling the operator's platform 10 to be laterally shifted transversely to the direction of travel. FIG. 7 shows a maximum outer position of the operator's platform 10, in which the raised cabin 26 projects vis-a-vis the one lateral outer wall 5.

Figure 8:
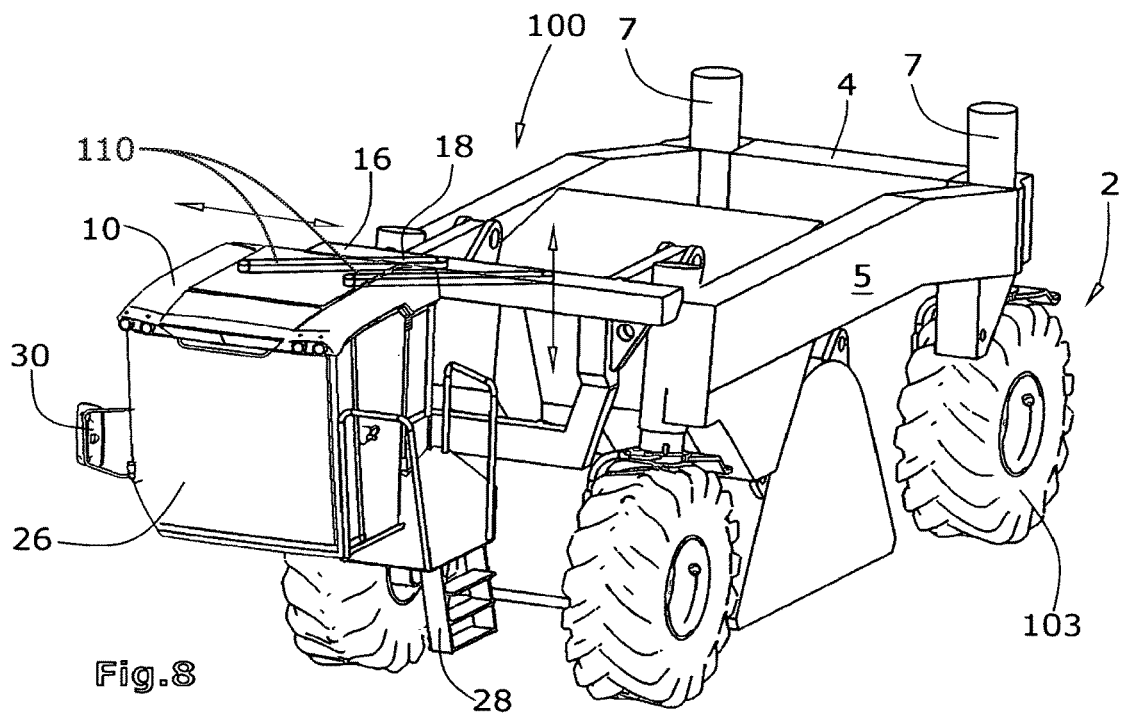
Figure 9:
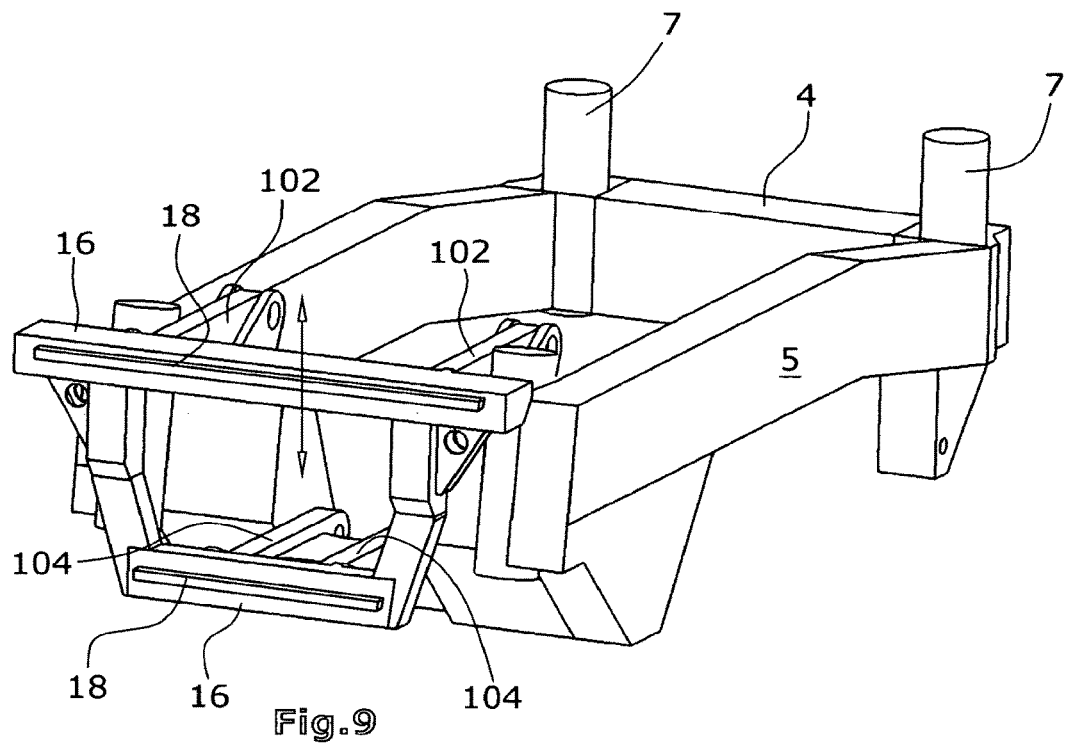
FIGS. 9 and 10 are a swivel frame of the machine frame of the stabilizer in accordance with FIGS. 7 and 8.

FIG. 8 shows an alternative guide 18 with control arms 110 arranged in a parallelogram-type manner, and a lowered cabin 26.

The upper cross beam of the swivel frame 16 extends across the full width of the machine frame 4 and may also project in height direction upwards beyond the roof of the cabin 26.

The swivel frame 16 may serve as rollover protection (Roll Over Protection Structure, ROPS).

Several tilting mirrors 30 may be arranged at the outer sides of the construction machines, in particular at the outer walls 5, the said mirrors 30 being suitable for operation by the machine driver by means of drive devices, so that additional persons are not required for these operations.

The cabin 26 may be moved into an especially elevated position for the maneuvering mode or the working mode.

Finally, video monitoring devices are arranged in several positions at the construction machine 1. A video camera 34 is located at the front end of the transport device 11 of the construction machine 1 shown in FIG. 1 for monitoring the discharge of material from the front transport conveyor 11 onto a means of transport, for instance, a truck.

A video camera 38 may be provided at the rear end of the construction machine 1 for monitoring the rearward area. Video cameras 36 may be arranged at the outer walls 5, which allow observation of the left or right machine side respectively in forward direction along the side walls 5. On the underside of the machine frame 4, a video camera 40 may be arranged at the front end of the machine frame 4, which can observe the area in front of the milling drum 6 of the construction machine 1.

As a result, the construction machines described can be operated by one machine driver without a helping person, as the machine driver can carry out all machine functions without being dependent on the assistance of a helping person, and without having to leave the operator's platform 10. Because of the video monitoring by means of the video cameras 34 to 40, and the display of the images on the operating and indicating panel 12, the transport of material onto a truck in case of a road milling machine, and the maneuvering mode when driving the construction machine 1 onto a low-loader, can also be carried out by the machine driver without a helping person.

Although a preferred embodiment of the invention has been specifically illustrated and described herein, it is to be understood that minor variations may be made in the apparatus without departing from the spirit and scope of the invention, as defined by the appended claims.

What is claimed is:

1. A front loading road milling machine, comprising:
   a machine frame having a frame front end and a frame rear end with reference to a direction of travel, the machine frame including essentially vertically arranged lateral outer walls, the machine frame having a frame width defined between the outer walls;
   a pair of front crawler track units and a pair of rear crawler track units for supporting the machine frame from a ground surface;
   a milling drum supported from the machine frame between the front and rear crawler track units for working the ground surface, the milling drum extending transversely to the direction of travel of the machine frame and having a drum end in close proximity to one of the lateral outer walls to define a zero side of the milling machine so that milling close to obstacles is possible on the zero side of the milling machine;
   a belt drive connected to the milling drum and arranged on the other lateral outer wall of the machine frame opposite from the zero side;
   a first transport conveyor arranged in front of the milling drum for receiving milled material from the milling drum;
   a second transport conveyor extending forward from the frame front end for receiving the milled material from the first transport conveyor and conveying milled material forward onto a transport vehicle located forward of the road milling machine, the second transport conveyor having a second transport conveyor front discharge end and a second transport conveyor rear end, the second transport conveyor rear end being pivotally connected to the frame front end so that the second transport conveyor is pivotal about both a horizontal axis and a vertical axis relative to the frame, the second transport conveyor including a structural framework, the second transport conveyor extending forward of the machine frame by a distance substantially greater than the frame width;

a plurality of lifting columns connected between the machine frame and the crawler track units for adjusting a milling depth of the milling drum by adjusting a height of the machine frame above the ground surface;

an operator's platform located on the machine frame;

a video camera supported from the structural framework of the second transport conveyor nearer to the second transport conveyor front discharge end than to the second transport conveyor rear end, the video camera facing forward and downward to monitor the discharge of material from the second transport conveyor onto the transport vehicle located forward of the road milling machine and the operator's platform further including a seat having a seat surface adjustable in height such that an eye level of the operator when sitting essentially corresponds to an eye level of the operator when standing within the operator's platform.

2. The road milling machine of claim 1, wherein the video camera is located adjacent an underside of the structural framework of the second transport conveyor.

3. The road milling machine of claim 1, wherein the video camera is located at the second transport conveyor front discharge end.

4. The road milling machine of claim 1, wherein the video camera is located adjacent an underside of the second transport conveyor adjacent the second transport conveyor front discharge end.

5. The road milling machine of claim 1, wherein the operator's platform is located between the front and rear crawler track units.

6. The road milling machine of claim 5, wherein the operator's platform is located above the milling drum.

7. The road milling machine of claim 1, wherein an operating and indicating panel is integrated into the operator's platform.

8. The road milling machine of claim 1, wherein the operator's platform includes an operating and indicating panel.

9. The road milling machine of claim 8, wherein the operating and indicating panel includes control, operating and indicating elements for a traveling mode, a milling mode, and for monitoring of the milling mode.

10. The road milling machine of claim 8, wherein the operating and indicating panel includes an indicating element for monitoring of the milling mode.

11. The road milling machine of claim 1, wherein the operator's platform includes an operating and indicating panel provided with a display for images from the video camera.

12. A front loading road milling machine, comprising:

a machine frame having a frame front end and a frame rear end with reference to a direction of travel, the machine frame including essentially vertically arranged lateral outer walls, the machine frame having a frame width defined between the outer walls;

a pair of front crawler track units and a pair of rear crawler track units for supporting the machine frame from a ground surface;

a milling drum supported from the machine frame between the front and rear crawler track units for working the ground surface, the milling drum extending transversely to the direction of travel of the machine frame and having a drum end in close proximity to one of the lateral outer walls to define a zero side of the milling machine so that milling close to obstacles is possible on the zero side of the milling machine;

a belt drive connected to the milling drum and arranged on the other lateral outer wall of the machine frame opposite from the zero side;

a first transport conveyor arranged in front of the milling drum for receiving milled material from the milling drum;

a second transport conveyor extending forward from the frame front end for receiving the milled material from the first transport conveyor and conveying the milled material forward onto a transport vehicle located forward of the road milling machine, the second transport conveyor having a second transport conveyor front discharge end and a second transport conveyor rear end, the second transport conveyor rear end being pivotally connected to the frame front end so that the second transport conveyor is pivotal about both a horizontal axis and a vertical axis relative to the frame, the second transport conveyor extending forward of the machine frame by a distance substantially greater than the frame width;

a plurality of lifting columns connected between the machine frame and the crawler track units for adjusting a milling depth of the milling drum by adjusting a height of the machine frame above the ground surface;

a video camera supported from the second transport conveyor nearer to the second transport conveyor front discharge end than to the second transport conveyor rear end, the video camera facing forward and downward to monitor the discharge of material from the second transport conveyor onto the transport vehicle located forward of the road milling machine;

an operator's platform located on the machine frame between the front and rear crawler track units and above the milling drum, the operator's platform including an operating and indicating panel and the operator's platform further including a seat having a seat surface adjustable in height such that an eye level of the operator when sitting essentially corresponds to an eye level of the operator when standing within the operator's platform.

* * * * *

UNITED STATES PATENT AND TRADEMARK OFFICE
CERTIFICATE OF CORRECTION

PATENT NO.        : 10,100,471 B2
APPLICATION NO.   : 14/922800
DATED             : October 16, 2018
INVENTOR(S)       : Christian Berning et al.

It is certified that error appears in the above-identified patent and that said Letters Patent is hereby corrected as shown below:

In the Specification

Column 2, Line 44: the word "dose" should be "close"

Signed and Sealed this
Eleventh Day of December, 2018

Andrei Iancu
*Director of the United States Patent and Trademark Office*